Nov. 1, 1932.   A. SAPIER   1,885,631
MOTION PICTURE PROJECTING MACHINE
Filed June 7, 1929   5 Sheets-Sheet 1

Nov. 1, 1932.  A. SAPIER  1,885,631
MOTION PICTURE PROJECTING MACHINE
Filed June 7, 1929  5 Sheets-Sheet 2

Witnesses  Inventor
Arthur M. Franke  Abraham Sapier,
Wm. E. Anderson  By Rummler & Rummler,
  Attys.

Nov. 1, 1932.  A. SAPIER  1,885,631
MOTION PICTURE PROJECTING MACHINE
Filed June 7, 1929   5 Sheets-Sheet 3

Nov. 1, 1932.   A. SAPIER   1,885,631
MOTION PICTURE PROJECTING MACHINE
Filed June 7, 1929   5 Sheets-Sheet 4

Witnesses.
Arthur M. Framke.
Wm. E. Anderson.

Inventor:
Abraham Sapier,
By Rummler & Rummler,
Attys.

Nov. 1, 1932.  A. SAPIER  1,885,631
MOTION PICTURE PROJECTING MACHINE
Filed June 7, 1929   5 Sheets-Sheet 5
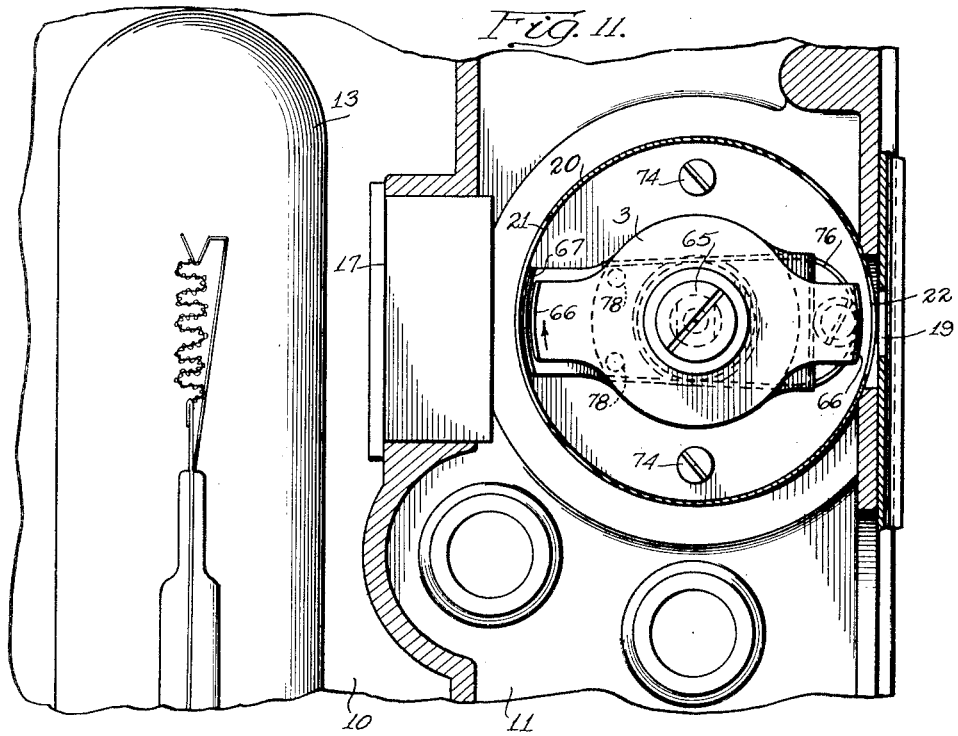
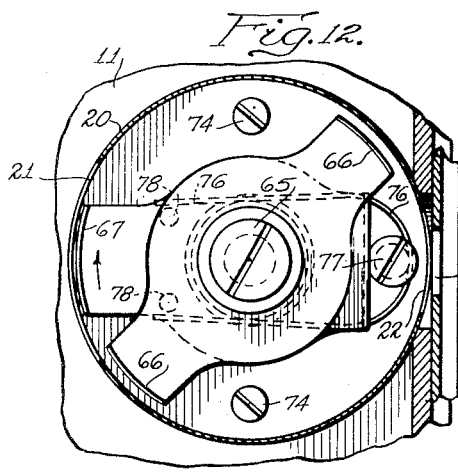 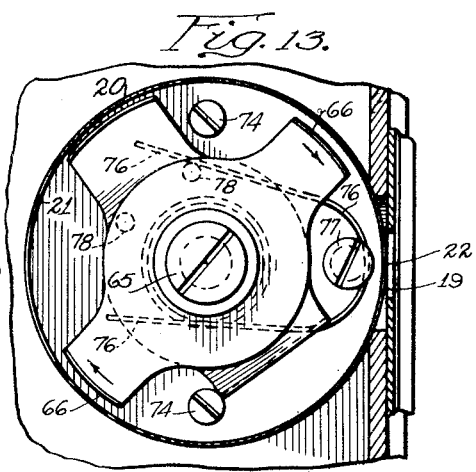

Patented Nov. 1, 1932

1,885,631

UNITED STATES PATENT OFFICE

ABRAHAM SAPIER, OF CHICAGO, ILLINOIS, ASSIGNOR TO UNIVERSAL STAMPING & MFG. CO., OF CHICAGO, ILLINOIS, A CORPORATION OF ILLINOIS

MOTION PICTURE PROJECTING MACHINE

Application filed June 7, 1929. Serial No. 369,126.

This invention relates to motion picture projecting machines.

The main objects of this invention are to provide a motion picture projector having an improved form and arrangement of power actuated driving mechanism which is compact so that it may be housed in a comparatively narrow casing; to provide an improved form of light interceptor for motion picture projectors; to provide an improved form of safety shutter adapted to automatically move into position to interrupt some of the light rays of the projector immediately upon the stopping of the light interceptor so as to permit the showing of a "still" picture without injury to the film; to provide improved manually controlled means for rewinding the film; to provide improved means for guiding the film; and to provide a motion picture projector of this kind having its parts arranged so as to occupy a minimum amount of space.

An illustrative embodiment of this invention is shown in the accompanying drawings, wherein:—

Fig. 11 is a vertical section, taken on the line 11—11 of Fig. 8, but showing the lamp and condenser in elevation.

Figs. 12 and 13 are fragmentary sections similar to Fig. 11 but showing the light interceptor and safety shutter in changed positions.

Figure 1:
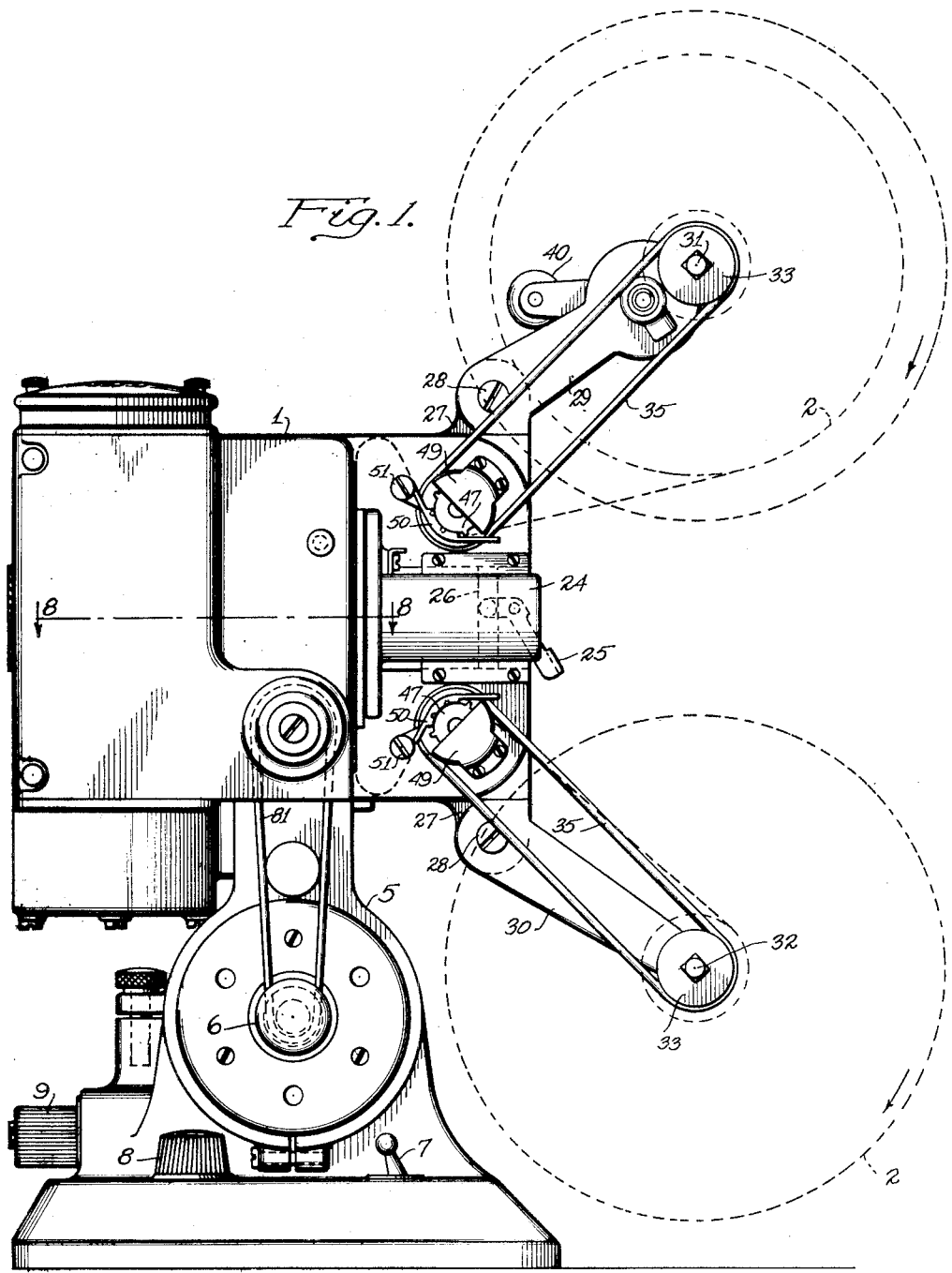
Figure 1 is a side elevation of an improved projecting machine, the film and film reels being shown in dotted outline.
Figure 2:
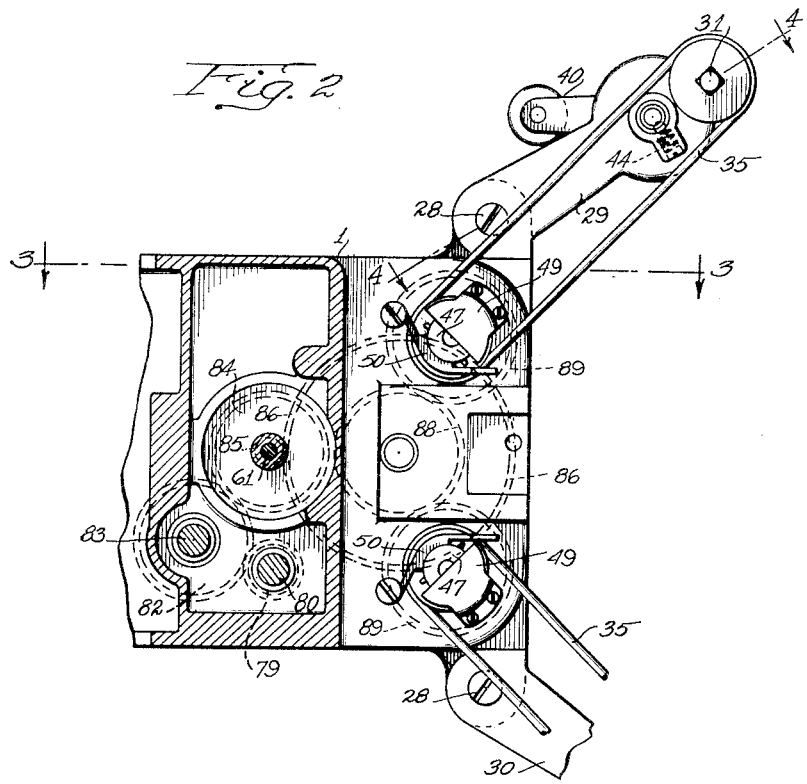
Fig. 2 is a fragmentary vertical section of the machine showing part of the driving mechanism; the view being taken on the line 2—2 of Fig. 3.
Figure 3:
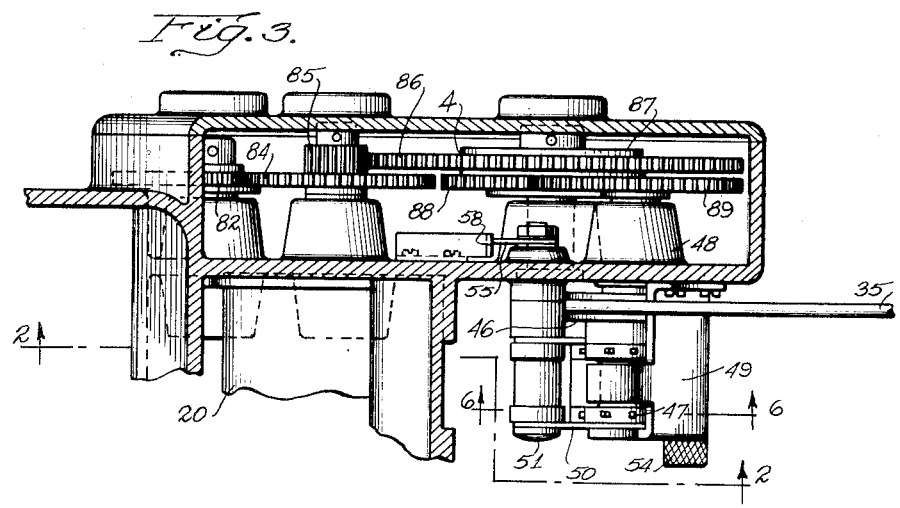
Fig. 3 is a fragmentary horizontal section, taken on the line 3—3 of Fig. 2.
Figure 4:
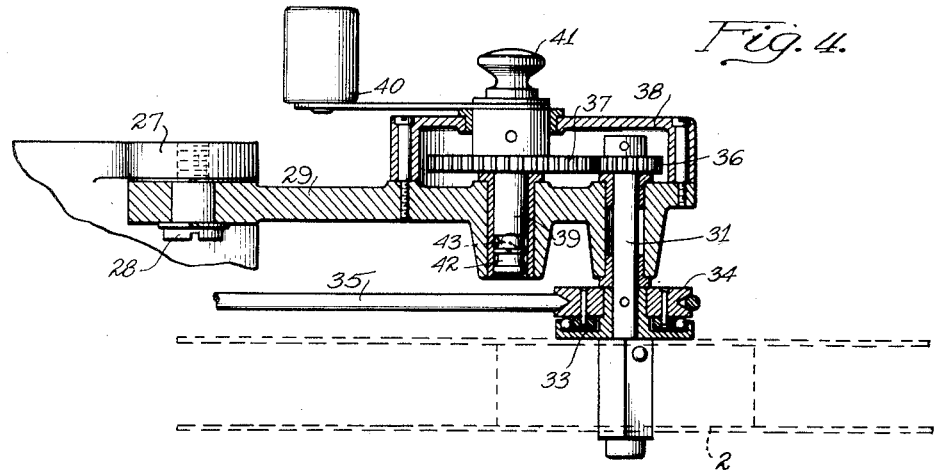
Fig. 4 is a section taken on the line 4—4 of Fig. 2, showing the manually operable film rewinding means.

In the specific form shown, the improved motion picture projector comprises a casing having the usual reflector, lamp, and condenser arranged behind a light aperture. Located between the condenser and the aperture, is an improved drum interceptor for interrupting the light rays, and an improved safety shutter adapted to move into the path of light upon the stopping of the interceptor for interrupting or screening the intense rays of light. Improved means is also provided for feeding the film across the sight aperture from one reel to another.

The film feeding means, light intercepter and safety shutter are all driven by a single driving mechanism which includes a train of gears located in substantially a single vertical plane on one side of the path of light.

In the construction illustrated, the improved projector comprises a casing 1 on which is rotatably mounted a pair of film reels 2 and an improved light intercepter 3 driven by improved driving mechanism 4.

The casing 1 is supported on a base 5, in which is mounted a suitable electric motor having a pulley 6 and being controlled by a switch 7 and rheostat 8. Current is supplied to the motor through conduits having a terminal plug 9 engaging terminals, not shown, in one side of the base.

The casing 1 preferably comprises a casting which is formed to provide a rear compartment 10, a front compartment 11, and a lateral compartment 12.

Located in the compartment 10, is a source of illumination comprising an upright lamp 13. Located in the rear wall of the casing 1, is a threaded opening 14, in which is seated an adjustable mounting 15, which supports a reflector 16.

Located between the compartments 10 and 11, is a light condenser comprising a mounting 17 in which is supported a plurality of lenses 18 arranged to direct the rays of light forwardly through an aperture 19 in the front wall of the compartment 11.

Mounted within the front compartment 11, is a cup shaped shell 20 having diametrically opposed apertures 21 and 22 in alinement with the lenses 18 and aperture 19. The base of the shell is rigidly secured to a wall 23, which forms a partition between the compartments 10 and 11. The inner surface of the shell 20 is preferably coated with black paint or other non-reflecting coating.

The wall 23 projects forwardly beyond the compartment 11 and supports a mounting 24, which carries the usual lens, not shown. Axial adjustment of the lens mounting is effected by means of a bell crank lever 25 pivotally secured to the wall 23 and engaging a recess 26 in the mounting.

Mounted on the upper and lower edges of the casing, are lugs 27 having pins 28 which support arms 29 and 30. Journaled in the outer ends of the arms 29 and 30, are shafts 31 and 32, respectively, which support the films reels 2. Supported on the shafts 31 and 32, are clutches 33 having pulleys 34, which are driven by belts 35 connected to a pair of feeding units journaled on the casing and driven by the improved mechanism 2.

Improved means are also provided for manually rewinding the film. In the form shown, the manually operable rewinding means includes a pinion 36 and gear 37 located within a housing 38, which is formed on the arm 29. The pinion 36 is fixed on the shaft 31 and the gear 37 is fixed on a shaft 39, having a crank handle 40 by which it is manually rotated.

The shaft 39 is axially shiftable in the housing 38, so as to permit the gear 37 to be moved out of engagement with the pinion when the film reels are power driven. The shaft 39 is pulled outwardly by means of a knob 41 mounted on its outer end. Formed on the inner end of the shaft 39, is a pair of annular grooves 42 adapted to receive a ball 43 for yieldingly securing the shaft in either of its positions. A spring 44 urges the ball 43 into engagement with one or the other of the grooves 42.

In the form shown, each of the power actuated film feeding units comprises a shaft 45, on which is fixed a pulley 46 connected to the belt 35 and a sprocket wheel 47 engaging the film. The shaft 45 is journaled in a boss 48 formed on the wall 23. Fixed on the casing wall 23 in proximity to the sprocket wheels, is a pair of guards 49.

Figures 5, 6:
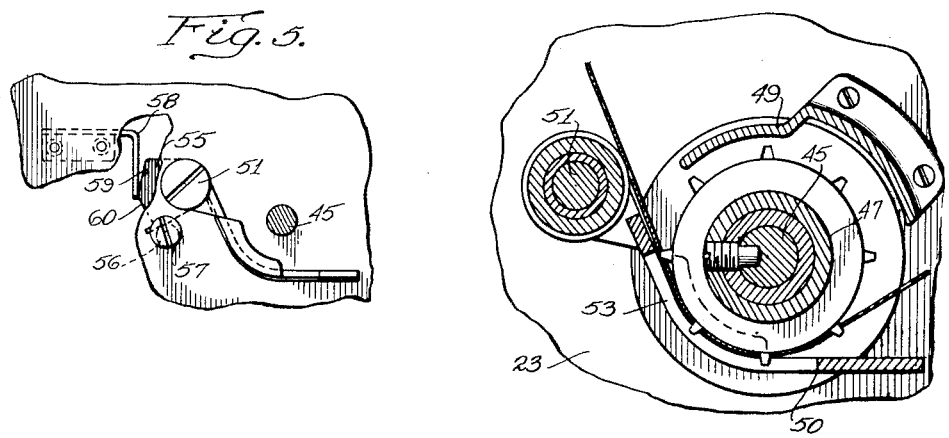
Fig. 5 is a detail in elevation of the film guiding means.
Fig. 6 is an enlarged vertical section of the film guiding means, taken on the line 6—6 of Fig. 3.
Figure 7:
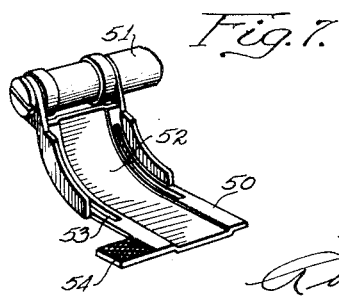
Fig. 7 is a perspective of the film guiding shoe.
Figure 8:
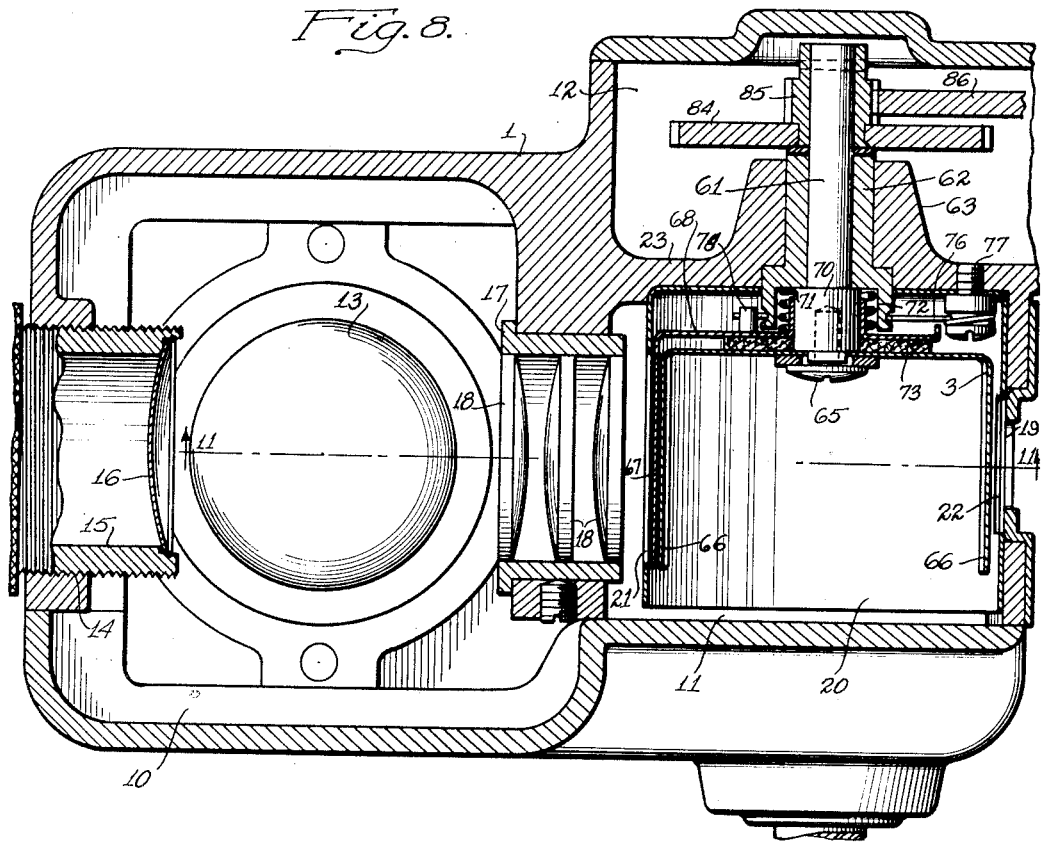
Fig. 8 is an enlarged horizontal section, taken on the line 8—8 of Fig. 1.
Figure 9:
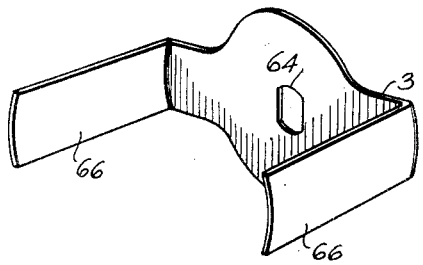
Fig. 9 is a perspective of the light interceptor.
Figure 10:
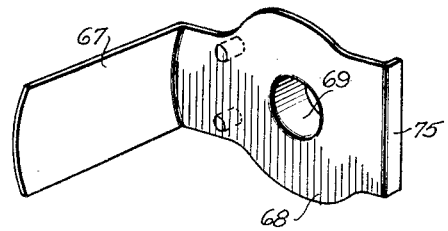
Fig. 10 is a perspective of the safety shutter.

Improved means is provided adjacent each of the sprocket wheels for retaining the film in effective engagement with the sprockets. In the form shown, each of the improved guides comprises a shoe 50 fixed on a shaft 51, which is journaled in the wall 23. The shoe 50 has an arcuate portion 52 provided with slots 53 which are adapted to receive the teeth of the sprocket when the shoe occupies its operative position, as shown in Fig. 6.

A finger grip 54 is formed on the outer end of the shoe 50 to permit the shoe to be readily swung into and out of its operative position. Secured to the inner end of each of the shafts 51, is a lug 55 which is adapted to engage an eccentric 56 mounted on a pin 57 for limiting the movement of the shoe toward the sprocket. By turning the pin 57 and eccentric 56, the shoe may be adjusted relative to the sprocket.

Mounted on the wall 23, is a spring 58 adapted to engage a shoulder 59 on the lug 55 for yieldingly holding the shoe in operative position. The spring 58 is also adapted to engage a shoulder 60 formed on the lug 55 for yieldingly securing the shoe in a retracted position to permit removal of the film from the sprockets.

In the construction illustrated, the drum interceptor 3 comprises a substantially U-shaped stamping fixed on a horizontal shaft 61 journaled in a bushing 62, which is supported in a boss 63 formed on the wall 23. Formed in the base of the interceptor, is an aperture 64 through which extends a screw 65 seated in one extremity of the shaft 61. The other end of the shaft 61 is connected to the improved driving mechanism 4.

Formed on the base of the interceptor, is a pair of arms 66, which are adapted to move transversely through the horizontal path of light for interrupting the light rays passing outwardly through the shell 20.

In the use of motion picture projecting machines, it is frequently desirable to stop the film and light interceptor for the purpose of exhibiting a "still" picture. However, if the film and interceptor were stopped without screening or cutting off some of the intense light rays passing out of the aperture, serious damage would result to the film. For this reason, an improved safety shutter 67 is mounted in the compartment 11 between the shell 20 and interceptor 3 and is arranged to automatically move into the path of light for obstructing some of the light rays as soon as the interceptor ceases to rotate, as illustrated in Fig. 12.

The shutter 67 is narrower than the aperture 21 so as to merely obstruct the light rays in the central portion of the path of light. In the form illustrated, the shutter 67 is formed on a base 68 having a hub 69 loosely embracing an enlarged head 70 on the shaft 61. Embracing the hub 69, is a spring 71 seated in a recess 72 formed in the bushing 62. The spring 71 is arranged so as to urge the base 68 of the shutter into frictional contact with a friction washer 73 which is located between the base 68 and the base of the interceptor 3, so that, during the rotation of the interceptor, the shutter is carried out of the path of light, as illustrated in Fig. 13.

To prevent the safety shutter from making complete revolutions with the drum interceptor, a pair of diametrically opposed pins 74 are mounted on the base of the shell 20 for limiting the movement of the shutter in either direction. Formed on the base 68 of the shutter, is a shoulder 75 adapted to engage one of the pins 74 when the interceptor rotates in one direction and to engage the other pin 74 when the interceptor is rotated in the opposite direction. In Fig. 13, the shoulder 75 engages the lower pin 74 due to the rotation of the interceptor in the direction of the arrow shown.

While the interceptor is idle, the shutter is urged into the path of light, as illustrated in Fig. 12, by means of a U-shaped spring 76, which is coiled around a stud 77 secured to the wall 23. The two arms of the spring 76 embrace the bushing 62 and are adapted to engage pins 78 mounted on the base 68 of the shutter.

In the form shown, the improved driving mechanism 4 comprises a train of gears located in the compartment 12 and disposed substantially parallel to the beam of light. In the train of gears, is a gear 79 fixed on a main drive shaft 80 which is journaled in the casing and which is connected to the motor pulley 6 by a belt 81. The gear 79 meshes with a gear 82 fixed on a shaft 83 journaled in the casing. The gear 82 meshes with a gear 84 fixed on the shaft 61 of the drum interceptor 3. Also fixed on the shaft 61, is a pinion 85 meshing with a gear 86 having a hub 87 on which is fixed a gear 88 which drives a pair of gears 89 fixed on the sprocket shafts 45.

In this improved construction, all of the shafts of the driving mechanism are disposed horizontally in parallel relation to one another and at right angles to the path of light. The gears are all disposed in substantially a single vertical plane which is parallel with the path of light.

In the operation of this improved projecting machine, the sprocket shafts 45 and the interceptor shaft 61 are driven by the improved driving mechanism 4 so as to feed the film from one reel to the other and to simultaneously rotate the drum interceptor 3. During the rotation of the interceptor, the friction washer 73 causes the safety shutter 67 to shift into engagement with one of the pins 74 and holds the shutter out of the path of light.

When it is desired to exhibit a "still" picture, the driving mechanism 4 is stopped so as to stop the interceptor and the film feeding means. As soon as the interceptor ceases to rotate, the spring 76 overcomes the friction of the washer 73 and shifts the shutter into the path of light, as illustrated in Figs. 11 and 12.

When it is desired to rewind the film, the knob 41 is pushed inwardly to shift the gear 37 into mesh with the pinion 36, whereupon the handle 40 may be rotated for rotating the shaft 31. During the rewinding of the film, the clutches 33 slip so as not to drive the belts 35.

Although but one specific embodiment of this invention has been herein shown and described, it will be understood that numerous details of the construction shown may be altered or omitted without departing from the spirit of this invention as defined by the following claims.

I claim:

1. A motion picture projecting machine comprising a casing having a light aperture therein, a lamp located behind said aperture, a shaft journaled in said casing, mechanism for rotating said shaft, a drum interceptor supported on said shaft and movable through the path of light for interrupting the light rays, a safety drum shutter loosely supported on said shaft, a spring normally urging said shutter into the path of light, a pair of stops for limiting the rotation of said safety shutter, and a second spring urging said safety shutter axially for frictionally connecting said shutter with said interceptor.

2. A cinematograph comprising a casing having a light aperture therein, a lamp located behind said aperture, a shaft journaled in said casing, mechanism for rotating said shaft, a pair of drum shutters supported on said shaft, one of said shutters being normally urged into the path of light and being also shiftable axially, and a spring arranged to shift said one shutter axially toward said other shutter for frictionally connecting said shutters together.

3. A cinematograph comprising a casing having a light aperture therein, a lamp located behind said aperture, a shaft journaled in said casing, mechanism for rotating said shaft, a pair of concentric drum shutters supported on said shaft, a friction disk located between said shutters, one of said shutters being axially shiftable, a spring urging said one shutter into the path of light, and a second spring surrounding said shaft and urging said one shutter axially toward said disk for frictionally connecting said shutters together.

Signed at Chicago this 5th day of June 1929.

ABRAHAM SAPIER.